Figure 3:
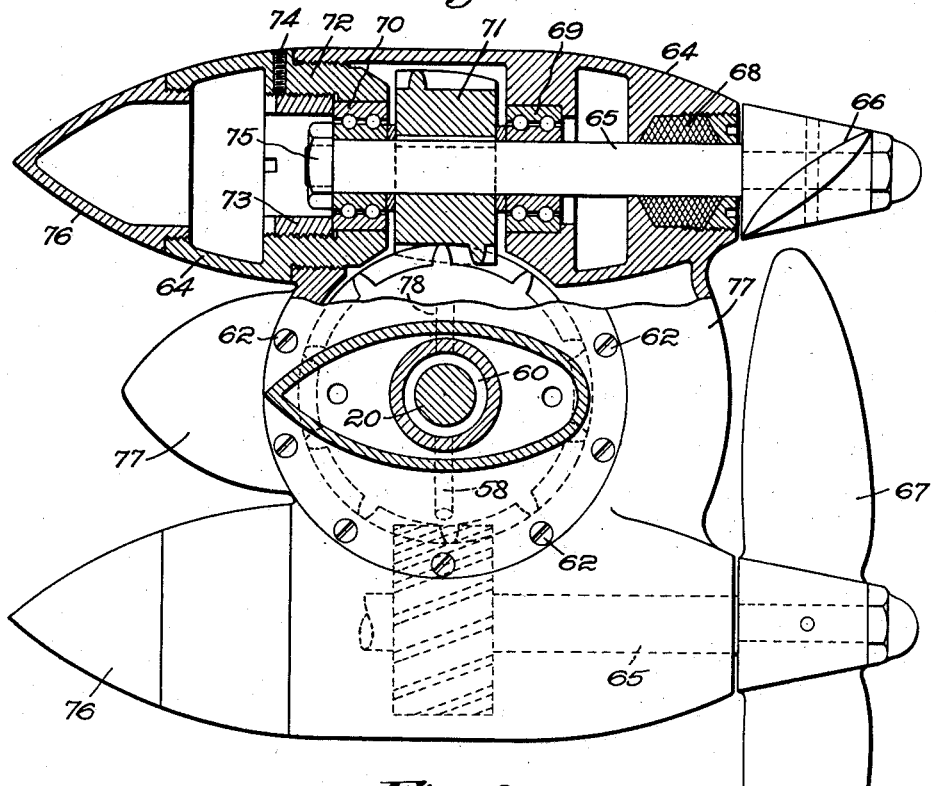

Sept. 8, 1931.   A. G. FITZ GERALD ET AL   1,822,573
OUTBOARD DRIVE FOR MOTOR BOATS
Filed Aug. 7, 1930   2 Sheets-Sheet 1
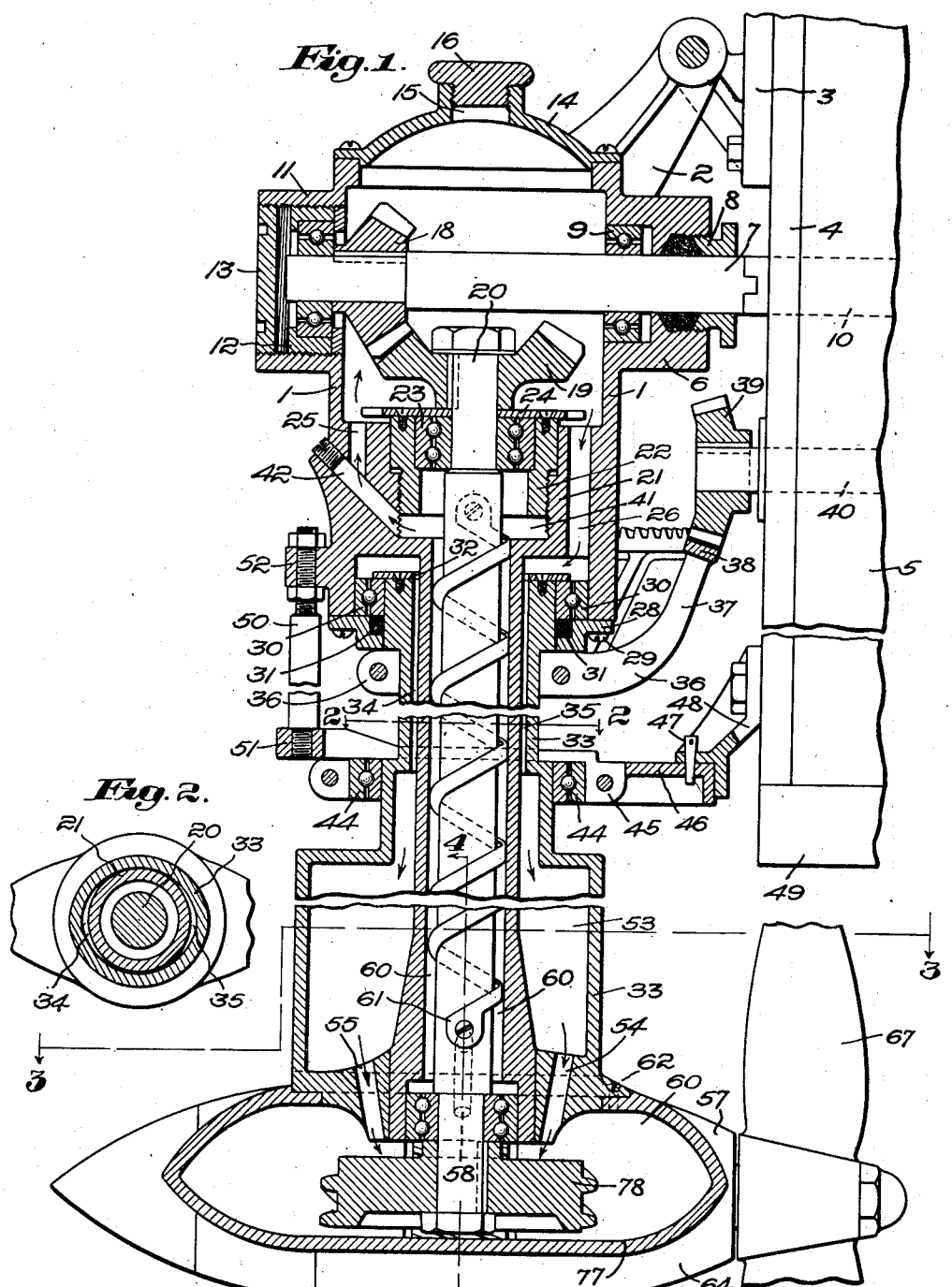
Inventors:
Arthur G. FitzGerald
Anders A. Anderson,
by Emery Booth Varney Townsend
Attys Sept. 8, 1931.  A. G. FITZ GERALD ET AL  1,822,573

OUTBOARD DRIVE FOR MOTOR BOATS

Filed Aug. 7, 1930   2 Sheets-Sheet 2

Inventors:
Arthur G. FitzGerald,
Anders A. Anderson,
by their Attorneys

Patented Sept. 8, 1931

1,822,573

UNITED STATES PATENT OFFICE

ARTHUR G. FITZ GERALD, OF WEST NEWTON, AND ANDERS A. ANDERSON, OF WALTHAM, MASSACHUSETTS; SAID ANDERSON ASSIGNOR TO SAID FITZ GERALD

OUTBOARD DRIVE FOR MOTOR BOATS

Application filed August 7, 1930. Serial No. 473,588.

This invention relates to driving means for boats, and especially to propellers for motor boats, and aims to provide a novel propelling mechanism having, among others, the advantages and improvements hereinafter mentioned.

Figure 4:
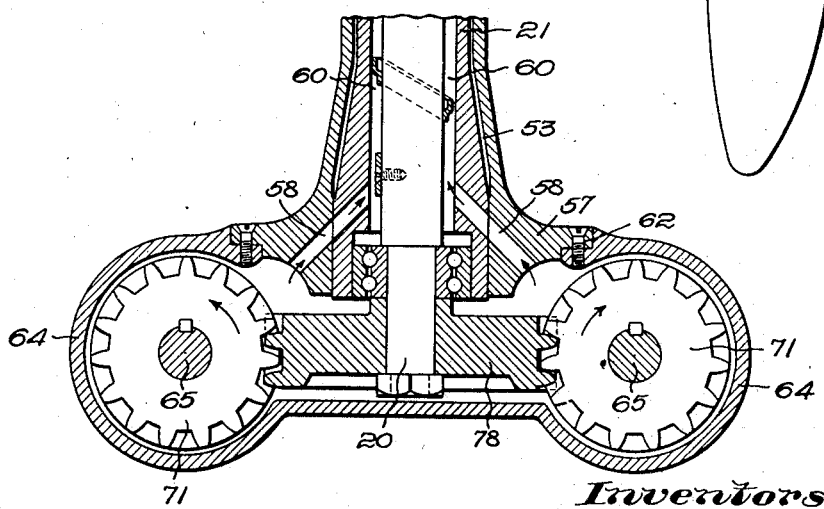

In the drawings of one embodiment of our invention selected for illustration and description, Fig. 1 is a vertical section of the mechanism mounted on the stern of a boat, which is partly broken away;

Fig. 2, a detail cross section on the line 2—2, Fig. 1, looking down;

Fig. 3, a horizontal section on the line 3—3, Fig. 1, looking down, showing one of the propeller housings in horizontal section; and Fig. 4, a vertical section of the lower end of Fig. 1, on a plane at right angles thereto.

While our invention may be embodied in either a pusher or tractor type of propeller, it is well recognized that propellers of the puller or tractor type as distinguished from the pusher type, have certain clearly defined advantages over the latter type, and my invention is, herein, shown embodied in a construction of the tractor type.

Referring first to Fig. 1, our invention comprises a driving gear housing 1, hinged or otherwise pivotally secured, as by the arm 2 thereon to the bracket 3 on the stern 4 of the boat 5, broken away for convenience.

On the housing side wall adjacent the boat is a boss 6 through which enters the motor drive shaft 7, from the motor in the boat, the boss having a stuffing box 8 built therein, and carrying also a roller bearing 9. The shaft outer section terminates just outside the box 7 and has a tongue and groove connection with the inner engine shaft section 10 for a purpose which will presently appear. The opposite wall of the housing also has a boss 11 thereon into which is adjustably secured, as by threading it, a roller bearing and its ring 12, and a plug 13, providing access to the former. The top of the housing has a hand hole cover 14, provided with an oil supply inlet 15 closed by the plug 16.

The shaft 7 carries, in the housing, a bevel gear 18 meshing with a similar gear 19 on the end of the upright drive shaft 20. This shaft is within a long tubular shaft housing 21, into the enlarged upper end of which is threaded a bushing 22 for receiving the bearing 23 retained therein by the plate 24. Oil ducts 25, 26 are provided at suitable points in the housing 1 and leading downward from the chamber of the gear housing 1. On its lower end, Fig. 1, the housing 1 is provided with a flanged collar 28 by means of screws 29, which collar carries bearings 30, packing 31 well above the water line, and on which bearings is suspended by a plate 32, the propeller housing 33 with oil ducts 34, 35, between it and the housing 1. I therefore provide a solid, tight housing 33 for the propeller, extending well above the water line and avoid much trouble now experienced from leaking joints between the drive shaft housing and propeller housing.

About the housing 33 is a split collar 36 with an angularly and upwardly extended arm 37 carrying a toothed segment 38 meshing with a bevel gear 39 on the steering shaft 40 extended through the stern of the boat, and controlled by the steering wheel, not shown. By this means limited rotative movement of the housing 33 and the propellers carried thereby, as will be described, are used to steer the boat.

In the housing 1 and below the bushing 22 therein is a circular chamber 41, from which leads the oil duct 25 already referred to, and to which leads an air vent 42 from the outside, through the housing 1.

The collar 36 and the propeller housing 33, Fig. 2, are, at the point where the collar engages it and just below it, made oval in form so that the collar may be tightened to have a firm grip on the housing for turning it. The housing 33 below the collar 36 is expanded and adjacent the expanded section, is a plurality of bearings 44 carried in a collar 45.

The collar 45 has a flange 46, which is connected by a shearing pin 47 with a bracket 48 on the stern of the boat near the keel 49, for giving stability to the housing 33. This object is further attained by means of a tension pin or strut 50 threaded at its opposite ends into a boss 51 on the collar 45 and a boss 52 on the housing 1, and locked in position by suitable nuts. Should the propeller strike a substantial obstruction, while running, the impact would cause the pin 47 to give way, thus releasing the propellers and their housings and permitting them, with the shaft housing above to swing outwardly and backwardly on the hinged arm 2 away from the obstruction and thus avoid serious damage to the stern of the boat.

A short distance below the collar 45, the housing is again expanded to provide an irregularly shaped oil receiving chamber 53 into which lead a plurality of oil ducts 54, 55 from the propeller gear housing 57. This expanded section of the housing also provides a substantial support for the propeller shaft housing to be described. From this housing also extend oil ducts 58, Fig. 4, to the circular chamber 60 about the shaft 20, and within the housing 1.

The shaft 20, Fig. 1, is provided with a helical thread 61 extended from the lower to near its upper end. Rotation of the gears in the housing, to be described, throws the oil up through the ducts 58 into the chamber 60 from which, by means of the thread 61, the oil is carried up through shallow chamber 41, and duct 25 about the gears 18, 19 and thence down through ducts 26, 35 to the chamber 53 and thence by ducts 54, 55 returned to the gear housing referred to.

To the bottom wall of housing 53 is secured, as by bolts 62, Figs. 1, 3, 4, the curvilinear, propeller gear housing 57 already referred to and which, with the housing 33, has limited rotative movement about the housing 1 through the steering mechanism about the lower end of the housing 1. This housing 57 carries at either side, Fig. 3, the torpedo shaped propeller shaft housings 63, 64. In these housings are the shafts 65 for the propellers 66, 67, which are alike and therefore a description of the construction of one will be sufficient.

At the forward end, adjacent the propeller 67 is a stuffing box 68, and the shaft is mounted in ball bearings 69, 70, between which, on the shaft, is a helical gear 71. The housings are provided at their rear ends with a threaded plug 72, permitting withdrawal to install or remove the helical gear 71 and a ring 73 is threaded into the plug 72 to lock the bearing 70 in place. This ring may, in turn, be locked in position by a set screw 74, in the housing. For removal of the ring 73 and to provide access to the nut 75 on the end of shaft 65, the end 76 of the housing is threaded to the body or shell 64, the interior being cut away to reduce the weight.

The housings 57, Fig. 3, are connected at their forward ends by a web-like section 77, the portion of the housing in the rear of the housings 57 being pointed like a torpedo to reduce wind resistance, and tendency to form a vacuum, following the forward movement of the housing. Each helical gear 71, Fig. 4, on a shaft 65 meshes with a cooperating gear 78 on the end of shaft 20, and which drives the propellers.

Outboard motors, with a single propeller, are of course in common use and it has been customary to use such and its housing as a rudder, for steering. There are, however, some well known objections and difficulties in so doing. To obviate these, we have conceived the plan of using two propellers driven synchronously by a common drive shaft.

In the first place, the single motor always tends to propel the boat at an angle. The constant pressure against one side of the boat of the water thrown against it by the propeller exerts a continued force tending to throw the bow of the boat in the opposite direction. Two propellers, however, turning in opposite directions, whether of the pusher or tractor type, propelled by the same drive shaft in synchronism, and both preferably turning outwardly, completely obviate this difficulty. Moreover, this continued pressure from the use of one propeller, against one side only of the boat, tends to aid it to capsize when the force of the waves or the wind is also against the same side of the boat. Many accidents, some of them fatal, have been ascribed to this condition by experts.

In use, the several housings described are supplied with oil through the opening 15. Thereafter as the gears 78, 71 rotate, their joint action drives the oil up through ducts 58, Fig. 4, to chamber 60 about the shaft 20 where it is received by the helical thread or bead 61 and carried up to chamber 41, duct 42, and duct 25 to the chamber in which rotate gears 18, 19.

From this point the oil again descends, through ducts 26, 35, to the chamber 53 and thence by ducts 54, 55 to the gears 71, 78 by which it is again forced upward as before. When filling the housing with oil the first time, the air vent 42 should be opened to permit the escape of air from the oil passage and chambers.

The oiling system is novel and particularly efficient and well adapted to the use of the construction. The shearing pin locking means for the housing and socket and groove drive shaft connection are valuable features for preserving the safety of the motor and the boat.

Our invention is not limited to the particular embodiment thereof described and illustrated.

Claims:

1. Boat propelling mechanism comprising an inboard motor, a hinged inner drive shaft housing, a vertically rotatable outer drive shaft housing, and means for rotating it from the boat, an interlocking two-part drive shaft between the housing and motor, and a plurality of propellers driven thereby synchronously.

2. Boat propelling mechanism comprising an inboard motor, a hinged inner drive shaft housing, a vertically rotatable outer drive shaft housing, a gear thereon meshing with a gear on the steering shaft, a plurality of propeller shafts and propellers thereon driven by the motor in opposite directions.

3. Boat propelling mechanism comprising an inboard motor, a hinged inner shaft housing, an outer shaft housing rotatable thereon, and a plurality of propellers carried by the outer housing, driven by one shaft and rotating outwardly with synchronized motion.

4. Boat propelling mechanism comprising an inboard motor, a hinged outboard multi-part drive shaft housing having a shearing pin connecting it to the boat, one part of the housing being rotatable vertically, and means on the boat for controlling its rotation, a multi-part drive shaft in the housing, and a plurality of propeller shafts carried by the housing with propellers synchronously rotating in opposite directions outwardly.

5. Boat propelling mechanism comprising an inboard motor, a hinged inner drive shaft housing, the housing being flanged and rotatably supporting an outer housing, said part having a gear sector thereon in mesh with a gear upon the boat for controlling it, and thus steering the boat, a shearing pin connecting the inner housing with the boat, a tension rod support for the outer housing, and twin housings on the outer shaft housing with propellers therein, and an oil circulating system in the housings.

6. Boat propelling mechanism including an outboard drive shaft housing, comprising a plurality of sections, one rotatable in and relatively to the other, a propeller shaft housing on one section, an oil circulating passage from the propeller shaft housing into the drive shaft housing, and an oil conveyor on the drive shaft to force the oil through the housing; and a return oil passage connecting the drive shaft housing with the propeller shaft housing.

In testimony whereof, we have signed our names to this specification.

ARTHUR G. FITZ GERALD.
ANDERS A. ANDERSON.